(12) United States Patent
Hegde et al.

(10) Patent No.: US 12,353,342 B2
(45) Date of Patent: Jul. 8, 2025

(54) HARDWARE CONNECTOR PIN REDUCTION FOR EXPANSION SLOT INTERFACES

(71) Applicant: Intel Corporation, Santa Clara, CA (US)

(72) Inventors: Mythili Hegde, Bangalore (IN); Aneesh R, Tamilnadu (IN); Ricardo Velasco, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 740 days.

(21) Appl. No.: 17/514,521

(22) Filed: Oct. 29, 2021

(65) Prior Publication Data

US 2023/0138265 A1 May 4, 2023

(51) Int. Cl.
| | |
|---|---|
| *G06F 13/20* | (2006.01) |
| *G06F 13/40* | (2006.01) |
| *H04W 52/18* | (2009.01) |
| *H04W 84/04* | (2009.01) |

(52) U.S. Cl.
CPC .......... *G06F 13/20* (2013.01); *G06F 13/4081* (2013.01); *H04W 52/18* (2013.01); *H04W 84/042* (2013.01)

(58) Field of Classification Search
CPC .... G06F 13/20; G06F 13/4051; H04W 52/18; H04W 84/042
See application file for complete search history.

(56) References Cited

U.S. PATENT DOCUMENTS

| | | | |
|---|---|---|---|
| 9,514,066 B1* | 12/2016 | Diaz | G06F 13/102 |
| 11,416,429 B1* | 8/2022 | Lin | G06F 13/4068 |
| 11,822,490 B2* | 11/2023 | Pandurangan | G06F 9/44505 |
| 2017/0308725 A1* | 10/2017 | Sardaryan | G06F 1/08 |
| 2018/0048559 A1* | 2/2018 | Chou | G06F 9/45558 |
| 2022/0360002 A1* | 11/2022 | Li | H01R 13/2407 |

\* cited by examiner

*Primary Examiner* — Henry Tsai
*Assistant Examiner* — Christopher A Daley
(74) *Attorney, Agent, or Firm* — Banner & Witcoff Ltd.

(57) ABSTRACT

The proposed techniques enable dynamic hardware and software (HW/SW) configurations to enable an expansion card to be adapted for use in various original equipment manufacturer (OEM) devices. The techniques use a software-based solution to detect device modes, states, etc. of a device in which the expansion card is implemented by leveraging the device's system resources. In doing so, the need for dedicated hardware pins and general purpose input-output (GPIO) pins, which are otherwise required to detect the current operating mode of the device using hardware-based solutions, are eliminated.

20 Claims, 6 Drawing Sheets

HARDWARE CONNECTOR PIN REDUCTION FOR EXPANSION SLOT INTERFACES

TECHNICAL FIELD

The disclosure described herein generally relates to expansion cards used for expansion slot interfaces and, in particular, to the use of software-based solutions to reduce the required number of dedicated hardware pins for expansion slot interfaces.

BACKGROUND

Wireless technologies such as cellular, wireless wide-area networks (WWAN or Mobile Broadband) Wi-Fi, Bluetooth, etc., use radio frequency (RF) signals to communicate between various devices. These technologies are used in nearly all electronic devices that connect to the Internet or otherwise perform wireless communications. A common technique to enable these wireless technologies in various devices includes the use of expansion cards. For instance, a device manufacturer (such as an original equipment manufacturer or OEM) may manufacture a portable electronic device that includes expansion slots or interfaces that comply with specific standards and communication protocols. Thus, the wireless connectivity for a particular device may be facilitated via the use of an expansion card or module, which is an add-on component that is often produced by a different manufacturer than the device OEM, and interfaces with the OEM device via a slot or port that is designed for this purpose.

As the use of wireless technologies in various portable devices increases, there is a need to further improve upon the user experience when using these various OEM products. Conventionally, there are several factors that may be leveraged to achieve this goal, which function to understand a device's current operating mode. For example, laptops and other mobile devices may support multiple operating modes such as a tablet mode, tent mode, etc. These devices extensively use sensors to understand the device position and the manner of use at a particular time. The OEM device connectivity services and other system hardware may leverage this information to enhance the user experience and performance of the device by increasing the battery life, fine tuning receiver parameters to comply with regulatory standards, etc.

However, for an expansion card to leverage the sensor information in this manner, current solutions require the expansion card, which interfaces with the OEM device via a suitable interface as noted above, to use dedicated hardware pins. Thus, the interface that functions to couple the OEM device and expansion card must dedicate hardware pins for this purpose. This requirement adds size, cost, and complexity to current expansion card designs, and also limits the manner in which sensor information may be implemented. Thus, current expansion cards and their accompanying interfaces have various drawbacks.

BRIEF DESCRIPTION OF THE DRAWINGS/FIGURES

The accompanying drawings, which are incorporated herein and form a part of the specification, illustrate the present disclosure and, together with the description, further serve to explain the principles and to enable a person skilled in the pertinent art to make and use the techniques discussed herein.

In the drawings, like reference characters generally refer to the same parts throughout the different views. The drawings are not necessarily to scale, emphasis instead generally being placed upon illustrating the principles of the disclosure. In the following description, reference is made to the following drawings, in which.

The present disclosure will be described with reference to the accompanying drawings. The drawing in which an element first appears is typically indicated by the leftmost digit(s) in the corresponding reference number.

DETAILED DESCRIPTION

Figure 1:
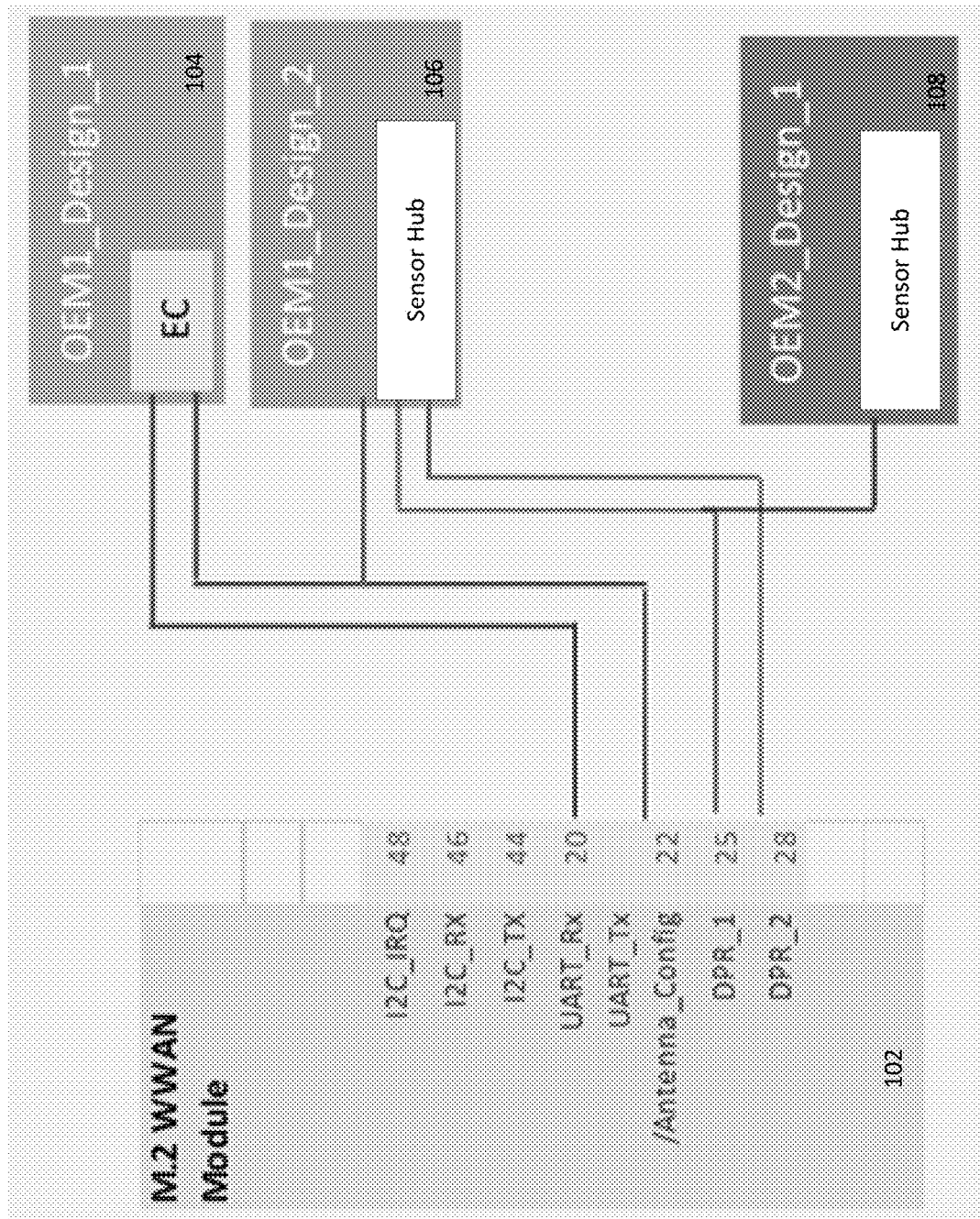
FIG. 1 illustrates connections between an expansion card and various OEM designs as known in the art.

The following detailed description refers to the accompanying drawings that show, by way of illustration, exemplary details in which the disclosure may be practiced. In the following description, numerous specific details are set forth in order to provide a thorough understanding of the present disclosure. However, it will be apparent to those skilled in the art that the various designs, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring the disclosure.

Again, an expansion card or module may provide a standalone wireless communication solution (such as WWAN, Wi-Fi, Bluetooth, etc.) for many different types of OEM devices. By interfacing with each of these devices (which may include laptops, mobile devices, routers, IoT devices, etc.) the expansion card enables each device to implement the wireless communication technologies supported by the expansion card. To detect a specific device mode used by each device, conventional approaches implement different techniques using dedicated hardware, which require dedicated hardware solutions.

For instance, each OEM device may implement specific hardware requirements based on a particular chassis design, which may support various device modes. Thus, meeting all OEM hardware requirements with a single expansion card hardware and software standalone solution is an arduous task. Additionally, device OEM's often use complex antenna design solutions, which include the use of tuning integrated circuits that contain specific impedance values (among other parameters). These solutions are used for specific frequencies to obtain the most broadband frequency coverage with as minimal antenna volume as possible while still meeting antenna performance requirements. However, as the upcoming "5G" standards and mmWave technology introduce more frequency bands in the sub 6 GHz spectrum, more complex RF solutions continue to emerge, and the dependency on complex antenna parameters to be stored (such as codebooks) continues to increase. These additional hardware requirements depend heavily on the device usage mode, such as how the device is oriented, how the device is being used, the proximity of a user to various device components, etc.

Current solutions that attempt to enhance the user experience for wireless communication technologies do not receive or otherwise consider input with respect to many of these aforementioned modes, i.e. how an end user interacts with the device (such as the device being placed on the user's lap, hands on the keyboard, proximity of use relative to antenna position, etc.). Thus, there is presently no unified mechanism to understand a current operating mode of the system of a particular OEM device without the use of dedicated hardware pins, which again adds complexity with respect to the design of a standalone and universal expansion card. In particular, the use of dedicated hardware pins in an OEM-specific manner requires the consideration of different hardware SKU and software configurations specific to each of the OEM designs. Further complicating this issue, there are no hardware pins available in current expansion card interfaces to allow for the configuration of certain parameters such as specific absorption rate (SAR) transmit power of mmWave antennas.

This issue is exacerbated by OEM's maintaining multiple hardware configurations to support different chassis designs. As a result, the use of dedicated hardware and corresponding software SKU leads to an overhead on the certification, verification, and maintenance of such products, which in turn increases their cost and time to market. As one scenario, different WWAN software configurations may be maintained based on the product SKU. As a result, WWAN performance degradation is caused by the limitations in detecting the correct system device mode and/or usage, which limits the dynamic fine tuning of WWAN parameters.

Thus, to address dynamic tuning WWAN parameters, conventional solutions may rely upon the use of multiple hardware-based device mode detection to reconfigure the WWAN parameters. However, such solutions require the use of multiple general-purpose input-output (GPIO) pins on WWAN hardware (such as the expansion card), and the cost of the system platform controller hub (PCH) is also increased as a result, which unnecessarily increases the overall cost as these pins are only used in some specific OEM scenarios. Other solutions include OEM device manufacturers attempting to only utilize a limited number of antenna configuration parameters for single mode use, such as only detecting clamshell mode versus closed mode based on limited RF feedback. But no user interaction modes are actively detected in accordance with such solutions to select the appropriate antenna parameters. That is, such solutions fail to detect the proximity of user, the location of a user's hands relative to laptop, etc., to adjust the antenna parameters proactively.

The various techniques described in further detail below address these issues by identifying the current operating mode of a device by leveraging the system resources of the electronic device. In doing so, the need for dedicated hardware pins to detect the current operating mode of a device are eliminated at both the expansion card side and the OEM device side. This helps to maintain unified hardware/software (HW/SW) platform across various OEM devices and chassis designs.

Thus, and as discussed further herein, the proposed techniques enable the design of a new expansion card connector (such as an updated or revised M.2 WWAN connector) standard to better support mmWave frequencies and protocols. Of course, the techniques as discussed herein may also be implemented using current data interfaces, connectors, and communication protocols. Moreover, the techniques described herein eliminate the present requirements to have dedicated HW pins both on the expansion card side and the OEM device side, thereby reducing the overall bill of materials (BOM) cost. Furthermore, it is noted that the techniques described herein enable device OEM's to no longer be limited in the number and/or type of sensors to detect the platform device modes. These sensors may thus connect to the OEM platform embedded controller (EC), which detects the device modes as further discussed below. The proposed techniques function to leverage the use of device mode detection to realize a single expansion card hardware SKU that may be used with multiple OEM chassis designs. This results in a reduction in the overall cost of productization with respect to HW design, SW Development, certification, verification, and maintenance, and reduces time to market.

Still further, the proposed techniques enable dynamic WWAN HW/SW configurations, which provides flexibility to device OEMs to fine tune different WWAN and system configurations based on the actual system and device state. That is, the techniques described herein are directed to a software-based solution to detect device modes, states, etc. This methodology allows an OEM to not only meet several industrial regulatory body requirements like the Federal Communications Commission, (FCC), CE, etc., but to also provide the best user experience in terms of power and performance. OEM design teams can also incorporate and call from the stored EC modes the various antenna parameters to optimize performance based on the device mode and/or how a user is interacting with the particular device.

One instance of such an expansion card that is referenced throughout the disclosure includes the M.2 card or module, which may interface with an accompanying device via an M.2 slot. Thus, the techniques as described herein may be particularly useful to define a new M.2 connector or for use with existing M.2 connectors, which may be used to support WWAN M.2 cards and mmWave Antenna configurations. However, the disclosure is not limited to the use of M.2 cards, interfaces, WWAN communication technologies, or specific types of slots. The techniques discussed herein may apply to any suitable type of expansion card (or other type of device that interfaces with another device) and accompanying interface.

FIG. 1 illustrates connections between an expansion card and various OEM designs as known in the art. The system 100 as shown in FIG. 1 includes an M.2 WWAN module, which may be a specific implementation of an expansion card. The system 100 as shown also includes three different OEM designs 104, 106, and 108. In the illustrated scenario shown in FIG. 1, the OEM devices 104 and 106 are the same OEM manufacturer but represent different products that use the same M.2 WWAN module 102, which may represent different chassis designs. The OEM device 108 represents a different product from a different manufacturer than the OEM devices 104, 106. The OEM devices 104, 106, and 108 may be identified with any suitable type of electronic device that implements an interface to communicate with the M.2 WWAN module 102. Thus, the M.2 WWAN module 102 may interface with each of the OEM designs 104, 106, and 108 independently (i.e. as separate respective combinations that represent each product's usage), although all three OEM devices are shown in FIG. 1 as being connected to the M.2 WWAN module 102 for ease of explanation.

The M.2 WWAN module 102 thus communicates with each of the OEM devices 104, 106, 108 to enable each device to perform wireless communications in accordance with any suitable type of WWAN communication protocol. The M.2 WWAN module 102 is coupled in each case to one of the OEM devices 104, 106, 108 via a data interface as shown in FIG. 1, which may be used to identify the status of operation of the OEM devices 104, 106, 108. The M.2 WWAN module 102 may utilize this information to adjust its operating parameters. However, to enable the M.2 WWAN module 102 to detect the status of a connected OEM device 104, 106, 108, dedicated hardware pins are required. For instance, the OEM device 104 obtains operational mode information via an embedded controller (EC), which is then communicated to the M.2 WWAN module 102 using the general purpose input/output (GPIO) pins denoted as the UART_Rx and UART_Tx/Antenna Config pins 20 and 22, respectively.

The OEM device 106 also requires the use of the UART_Tx/Antenna Config pin as well as the dedicated hardware pins DPR_1 and DPR_2, whereas the OEM device 108 uses the dedicated hardware pins DPR_1 and DPR_2. The DPR_1 and DPR_2 pins may correspond to a dynamic proximity detection pin that is coupled to a suitable antenna input on the OEM devices 106, 108, which may indicate a user proximity to each antenna. Thus, because the M.2 WWAN module 102 needs to ensure compatibility with each OEM device 104, 106, 108, the requirement of dedicated hardware pins, as well as the different options among the various OEM devices, complicates the ability to design the M.2 WWAN module 102 for compatibility with each OEM device. Furthermore, the physical limitations of the number of available dedicated hardware pins places significant limitations on the amount of operational mode information that may be utilized by the M.2 WWAN module 102. For instance, the DPR_1 and DPR_2 inputs are respectively coupled to separate antennas. Therefore, in the event that the OEM devices 106, 108 implement additional antennas, no operational mode information may be communicated to the M.2 WWAN module 102 with respect to these additional antennas in such scenarios.

Figure 2:
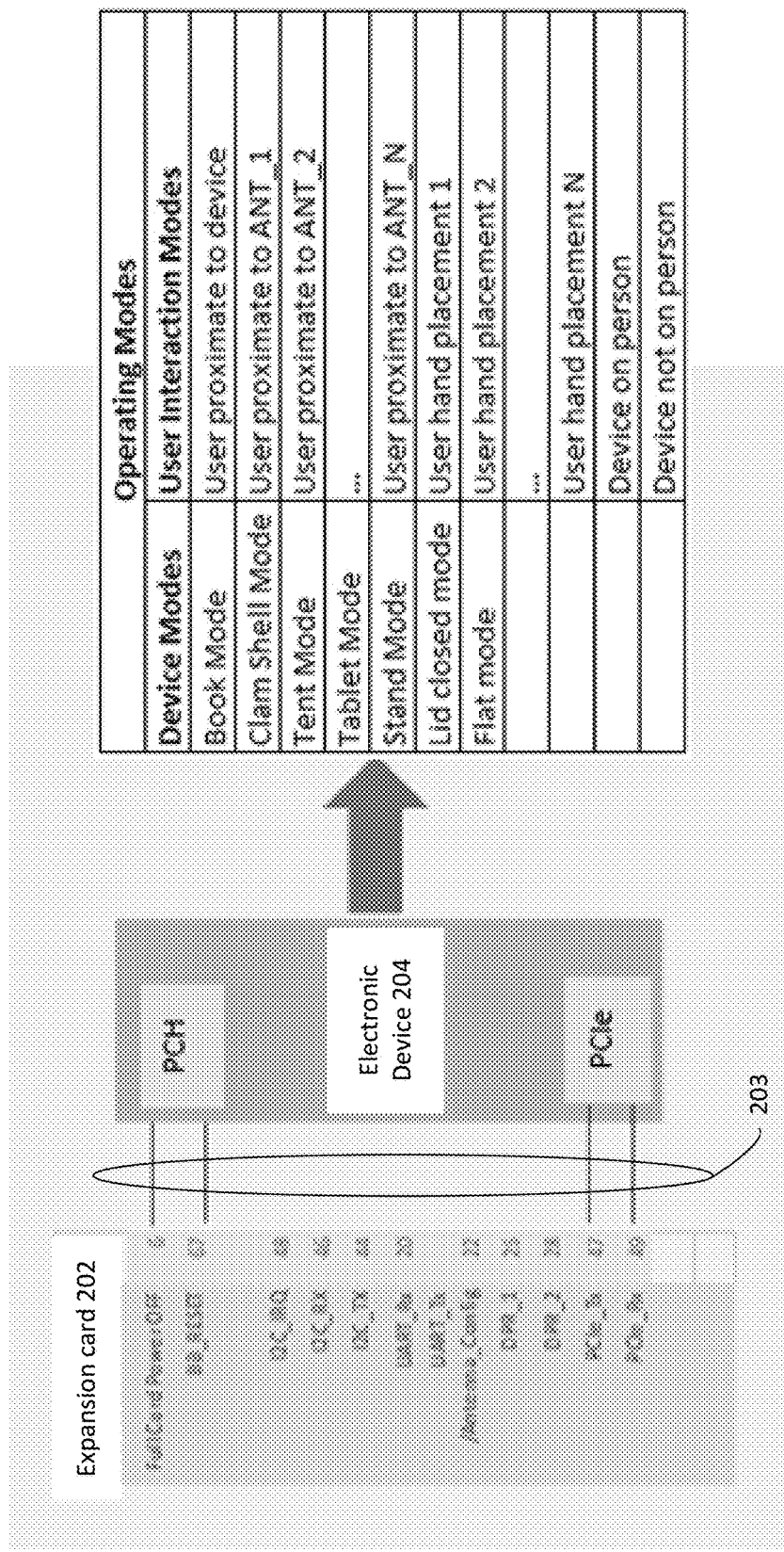
FIG. 2 illustrates a connection between an expansion card and an electronic device indicating various operating modes, in accordance with the disclosure.

The present disclose addresses these issues using techniques that implement a software-driven approach to communicate operational mode information to expansion cards, as discussed in further detail herein. FIG. 2 illustrates a connection between an expansion card and OEM design indicating various user interaction modes, in accordance with the disclosure. In the overview as shown in FIG. 2, the system 200 includes an expansion card 202 communicatively coupled to an electronic device 204 via an interface 203. The interface 203 may represent any suitable combination of wires, ports, buses, etc., that facilitate the expansion card 202 being electrically and communicatively coupled to the electronic device 204. The interface 203 may represent, in one scenario, the connection between the connector of the expansion card 202, the slot or mating connector of the electronic device 204, as well as any suitable buses, wires, ports, transmitters, receivers, etc. on the electronic device 204 and the expansion card 202 that function to facilitate communications between the expansion card 202 and the electronic device 204.

The electronic device 204 may be identified with any suitable number and/or type of electronic device that may utilize the expansion card 202 to perform specific functions. In various scenarios, the electronic device 204 may be identified with a personal computer, a tablet computer, a laptop, a convertible laptop or tablet, a mobile device, a wearable electronic device, etc. The expansion card 202 may provide any suitable type of function that may include wireless communications (such as the aforementioned M.2 WWAN module) in accordance with any suitable number and/or type of communication protocols, or other suitable functions that may not include wireless communications. Regardless of the particular implementation of the expansion card 202 and the electronic device 204, the electronic device 204 may have various operating modes, which are used to influence the operation of the expansion card 202.

The electronic device 204 may implement any suitable number of sensors that detect various operating modes, and then provide this information to the expansion card 202 to enable the expansion card to adapt its operating parameter settings accordingly. Advantageously, the electronic device 204 may implement a platform controller hub (PCH) and data interface (shown in FIG. 2 as a PCIe interface, but not limited to this particular implementation) to communicate with the expansion card 202. In this way, the expansion card 202 may adjust its parameter settings based upon any suitable number of different operating modes without the use of (and without being limited by) dedicated hardware pins, in contrast to the conventional arrangement as discussed with respect to FIG. 1 above. Thus, the techniques discussed herein provide greater flexibility by enabling the electronic device 204 to manage how operational modes are be defined and how each of the defined operational modes should influence the operation of the expansion card 202.

FIG. 2 illustrates a scenario showing various operating modes in a non-limiting sense. The term "operating modes" or "operational modes" as used herein may encompass any suitable type of use and/or state of the electronic device 204, and which may include what is referred to herein as "device modes" and "user interaction modes." The device modes may represent different orientations of the electronic device 204 based upon its particular implementation. For a convertible laptop or other suitable relevant device, the device modes may be defined based upon an angle between the display and keyboard, such as the book mode, clam shell mode, tent mode, tablet mode, stand mode, lid closed mode, and flat mode as shown in FIG. 2. Of course, the electronic device 204 may define additional, fewer, or alternate device modes based upon its particular implementation.

The user interaction modes may encompass any suitable type of mode that is based upon a manner in which a user is interacting with the electronic device 204. This may include how a user is holding the electronic device 204, whether the electronic device is stationary or being moved, the proximity of the user (or various body parts such as the user's head, hands, etc.) to the electronic device (or to specific parts of the electronic device 204 such as one or more antennas), the location of the user's hands with respect to the electronic device 204, whether the user is holding the electronic device 204, whether the electronic device 204 is located on a table, etc. Again, the electronic device 204 may define additional, fewer, or alternate user interaction modes based upon its particular implementation.

Thus, when in use, the electronic device 204 may be engaged by the user in any of the aforementioned operational modes, which again constitute both device modes and user interaction modes. To provide an illustrative scenario, a user may be positioned in front of a laptop and engaged passively such as reading content. As another illustrative scenario, a user may be actively engaged typing with his hands closer to the antenna locations, thereby impacting their performance. As yet another illustrative scenario, a user may have a laptop positioned on their lap or placed on a table, both of which significantly impact the performance of the antennas. Detecting these operational modes may be used to inform the antenna RF subsystems, which may be implemented via the expansion card 202, to adapt to more optimized antenna parameters and to use these parameters for improved RF performance, to enable/disable specific module features (such as WWAN features), to implement specific frequencies and cellular carrier combinations ("carrier aggregation (CA) combos"), etc. Thus, the expansion card 202 may adjust its parameter settings in response to the particular operational mode of the electronic device 204 in accordance with various predetermined expansion card functions for which the expansion cards 202 is implemented to perform. Thus, the adjustment of parameter settings may include, for the scenario in which the expansion card 202 performs wireless communications, the adjustment of antenna tuner values, mmWave codebooks, transmit power back offs, pattern steering parameters, tuning to specific frequencies of use, enabling and/or disabling communication-based features, etc.

Moreover, although the disclosure provides various scenarios in which the expansion card 202 adjusts parameter settings identified with wireless communications, the disclosure is not limited to these particular uses. Instead, the operational mode information may include any suitable type of information that may be leveraged by the expansion card 202 to adjust one or more aspects of its operation to enhance the user experience of the electronic device 204. In one illustrative scenario, the electronic device 204 is used in a tablet mode, and this information is transmitted to the expansion card 202 via the data interface 203. Continuing this scenario, the expansion card 202 may adjust the frequency in which thermal parameters are monitored versus the operation of the electronic device 204 in the stand mode, thereby enhancing the user experience.

Moreover, it is noted that the operational modes may further be extended to encompass modes not inherent to the electronic device 204. To provide some illustrative scenarios, the operational modes may include the use and/or status of an accessory (such as a connected USB-C docking station mode), co-existence with a particular wireless communication technology and/or frequency bands (such as Wi-Fi operating at 2.4 GHz or 5 GHz), etc. Thus, the operational mode information may include the usage of such additional accessories or other information, which may be provided to the expansion card 202 to adjust the parameter settings based upon the particular application and/or scenario.

Thus, regardless of the particular implementation of the electronic device 204, the expansion card 202 may be dynamically controlled by understanding the current operating mode of the electronic device 204 using the operational mode information, which is transmitted to the expansion card 202. As further discussed in detail below, this control may be executed locally via the expansion card 202 in response to the electronic device 204 transmitting an operating mode identifier that is indicative of a current operating mode of the electronic device 204.

The flow of operations that enable the identification of the particular operating mode of the electronic device 204 and the adjustment of parameter settings used by the expansion card 202 are further discussed below. To this end, FIG. 3 illustrates a block flow diagram between an expansion card and an electronic device, in accordance with the disclosure.

Figure 3:
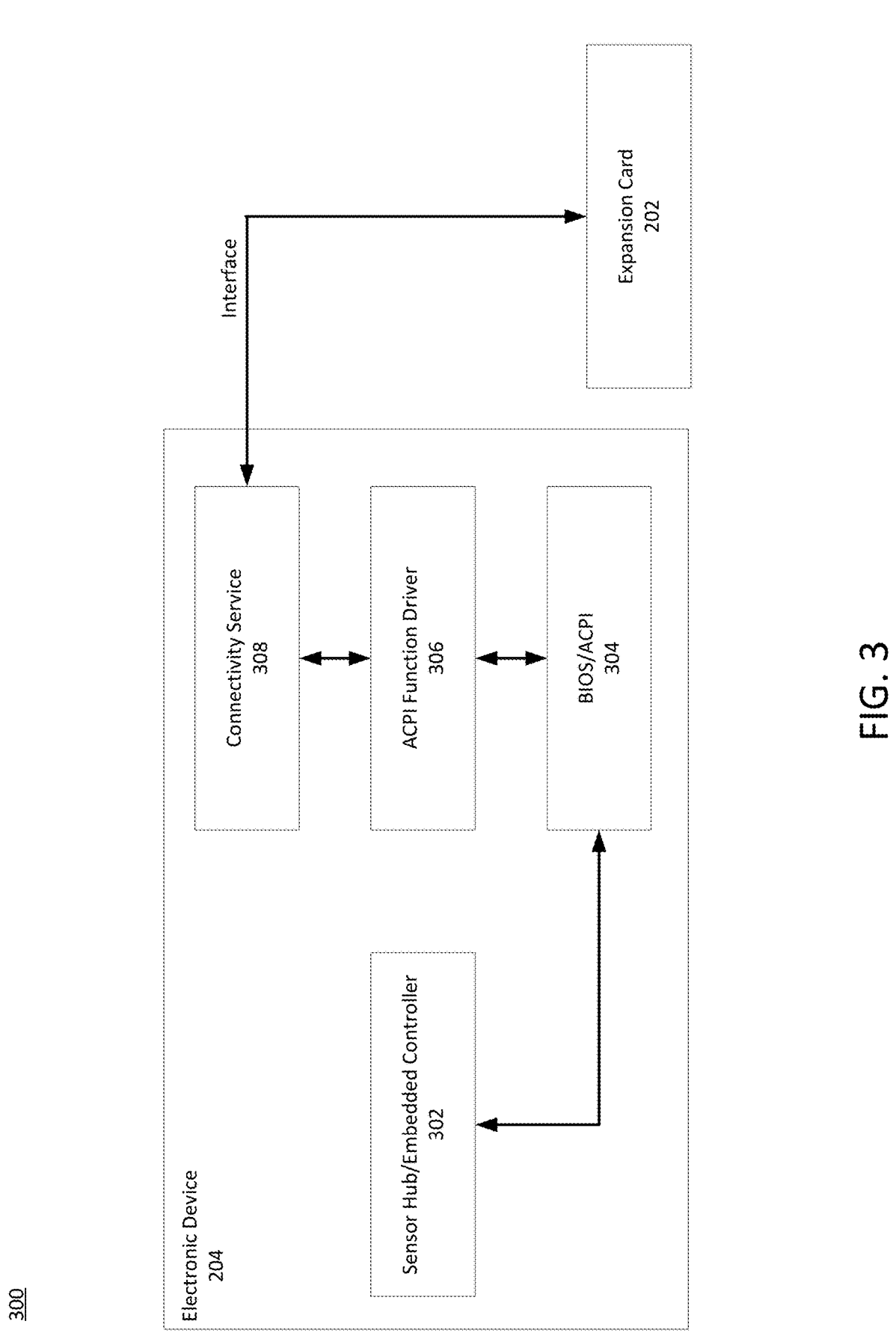
FIG. 3 illustrates a block flow diagram between an expansion card and an electronic device, in accordance with the disclosure.

The expansion card 202 and the electronic device 204 may be identified with the components having the same reference numbers as shown in FIG. 2, with additional components shown in FIG. 3 to provide additional clarity.

As shown in FIG. 3, the electronic device electronic device 204 may comprise a sensor hub and/or embedded controller 302 (or other suitable controller, processing circuitry, etc.). Depending upon the particular implementation, the sensor hub may include any suitable number and/or type of sensors that function to detect particular device modes and/or user interaction modes with the electronic device 204, as discussed above. These sensors may include any suitable number and/or type of sensors configured to measure any desired device mode and/or user interaction mode of the electronic device 204. Some illustrative scenarios of the sensors may include accelerometers, light sensors, magnetic sensors, proximity sensors, antenna feedback monitoring circuitry, infrared sensors, etc. The sensors may function to measure any suitable number and/or type of metrics that allow the electronic device 204 to establish any suitable number of predefined operational modes, as discussed above. The embedded controller portion of the sensor hub and/or embedded controller 302 may be implemented as any suitable number and/or type of processing circuitry, controller, hardware components, software components, or combinations of these. In any event, the embedded controller functions to map the measured sensor metrics obtained via one or more sensors in the sensor hub to a specific predetermined operational mode.

To provide an illustrative scenario, the embedded controller may identify a particular operational mode from a current device mode, a current user interaction mode, or combinations of these. In this way, the electronic device 204 may define any suitable number of conditions using the sensor metrics for which various operational modes are defined, and which should result in an adjustment to the parameter settings implemented via the connected expansion card 202 as noted herein. Thus, the techniques described herein provide an OEM device manufacturer with additional flexibility to customize how operational modes are defined for a particular product.

Regardless of the number of operational modes that are defined by the electronic device 204, the electronic device 204 may store information regarding the various operational modes in any suitable type of memory, such as a non-volatile memory. In the scenario illustrated in FIG. 3, the electronic device 204 implements a basic input/output system (BIOS) and Advanced Configuration and Power Interface (ACPI) 304, and the operational mode information may be stored in the BIOS as further discussed herein. However, this is a non-limiting scenario, and the operational mode information may be stored in any suitable type of non-volatile memory that may be accessed and written to by the various components of the electronic device 204, as further discussed herein.

Figure 4:
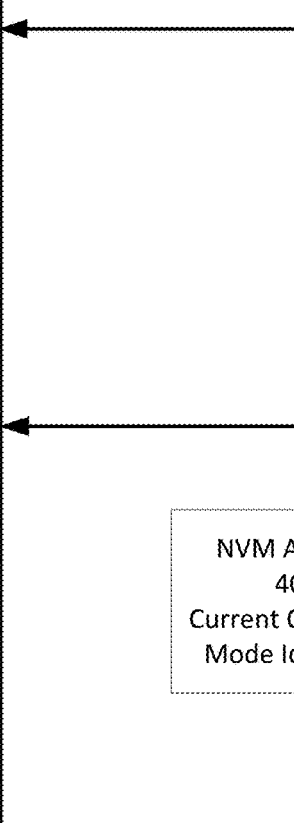
FIG. 4 illustrates a stored table of operational modes and corresponding indices for an electronic device, in accordance with the disclosure.

To illustrate the operational mode information that may be stored by the electronic device 204, FIG. 4 shows one scenario that represents a table of data, which again may be stored in any suitable type of non-volatile memory such as the BIOS/ACPI 304 (which may be optionally stored as part of the ACPI table information). The table 400 as shown in FIG. 4 maps each operational mode defined by the electronic device 204 to an index value, which may be recognized and used by the connected expansion card 202 as further discussed herein to adjust the parameter settings of the expansion card 202. The operational modes are also organized according to each potential region of operation of the electronic device 204 (i.e. by each regulatory mode). That is, the operational modes may be mapped to parameter settings used by the expansion card 204 for each regulatory mode of operation to ensure that the frequency bands, transmission output power, etc., comply with the particular region in which the electronic device 204 and the expansion card 202 are operating.

Thus, the table 400 as shown in FIG. 4 may represent a complete table that is stored in non-volatile memory of the electronic device 204, which represents operational mode information for each possible operating region (i.e. regulatory mode). As discussed in further detail below, the electronic device 204 may obtain knowledge of this regulatory operating region via communications received from the connectivity service block 308 as a result of communications between the connectivity service block 308 and the expansion card 202. Alternatively, the connectivity service block 308 may obtain the regulatory mode information in any suitable manner, such as reading a subscriber identity module (SIM) card, reading regulatory information from any suitable type of stored configuration files, etc.

In any event, the embedded controller (or other suitable system resources) of the electronic device 204 is/are configured to identify, based upon the sensor data, which of the operational modes the electronic device 204 is currently operating, which again may be defined in accordance with any suitable predetermined scheme. The embedded controller 302 may then write the current operational mode information into the BIOS or any other suitable non-volatile memory location implemented by the electronic device 204. In the scenario as shown in FIG. 4, this may be accomplished via the embedded controller 302 writing an address pointer or address location to a predetermined location 402 in the BIOS or other non-volatile memory location that identifies a table entry corresponding to the current operational mode of the electronic device 204 for each regulatory mode. In other words, the NVM address 402 may contain, at any particular time, the location of the entries in the table 400 that correspond to the current operational mode of the electronic device 204 for each possible regulatory mode. Thus, as the current operational mode of the electronic device 204 changes, the contents stored at the NVM address 402 may be updated.

The electronic device 204 also comprises an ACPI function driver block 306, which may be implemented as any suitable driver (such as executable instructions representing an executed software-based application) configured to determine the operational mode information from the table 400. In one scenario, the ACPI function driver block 306 may be implemented as a kernel mode driver, which is provided with the operational mode information of the electronic device 204 via the BIOS/ACPI 304. This process may occur via the BIOS/ACPI providing the contents of the table entries indicated by the NVM address 402 to the ACPI function driver block 306, the ACPI function driver block 306 reading the contents of the NVM address 402 and using this address to identify the table entries indicated by the NVM address 402, etc. This may be implemented in one scenario via registered services utilized by the ACPI function driver block 306 reading the operational mode information from the table using the NVM address 402.

However, because the connectivity service block 308 identifies the regulatory mode information as noted above, the connectivity service block 308 may pass this information on to the ACPI function driver block 306, which then "filters" the operational mode information accordingly to identify a matching table entry for that particular regulatory mode. Thus, the ACPI function driver block 306 is configured to dynamically identify the current operational mode of the electronic device 204 for any identified operational region as this operational mode changes or in accordance with any suitable type of reporting and/or monitoring schedule. In one scenario, the ACPI function driver block 306 is notified each time the contents of the NVM address 402 changes. Alternatively, the ACPI function driver block 306 may periodically read the contents of the NVM address 402.

In any event, the electronic device 204 also comprises a connectivity service block 308, which may function as a bypassing mechanism between the ACPI function driver block 306 and the expansion card 202. Again, the connectivity service may identify the regulatory mode information via communications with the expansion card 202, and notify the ACPI function driver block 306 of this information. This enables the ACPI function driver block 306 to provide the current operational mode and corresponding table index value to the connectivity service block 308 as part of a data transmission that represents an operating mode identifier. As discussed in further detail herein, the operating mode identifier may be identified with the corresponding table index value, and may additionally or alternatively be identified with other information that may be used by the expansion card 202 to determine how to adjust the parameter settings. The connectivity service block 308 may be implemented as any suitable type of data interface that communities with the expansion card 202 as shown in FIG. 3. The connectivity service block 308 thus dynamically provides the operational mode information to the expansion card 202 as the device mode and user interaction modes of the electronic device 202 change over time.

Figure 5:
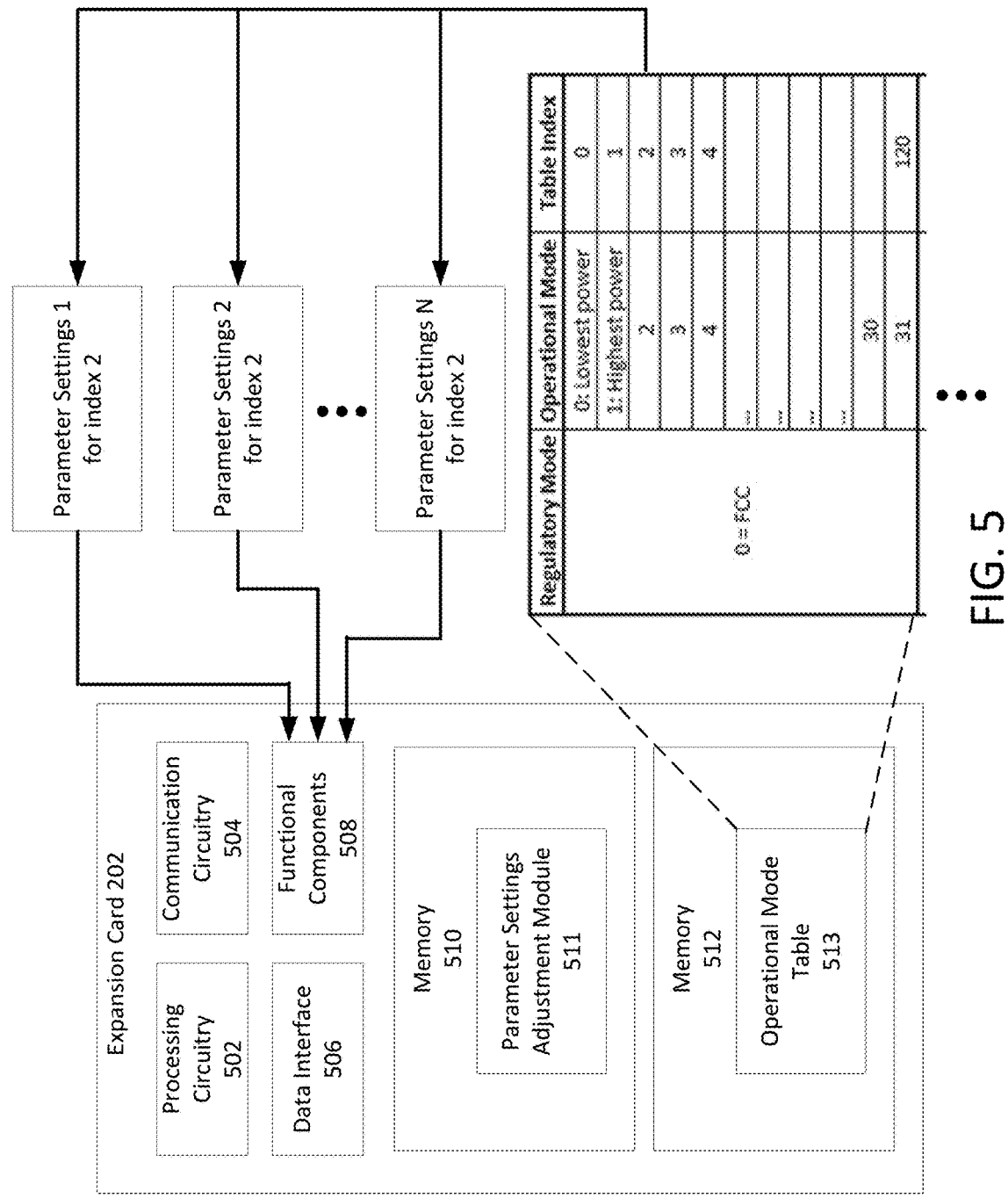
FIG. 5 illustrates a block diagram of an expansion card, in accordance with the disclosure.

FIG. 5 illustrates an expansion card, in accordance with the disclosure. The expansion card 202 may be identified with the expansion card 202 as shown and discussed herein with reference to FIGS. 2 and 3. As shown in FIG. 5, the expansion card 202 includes processing circuitry 502, communication circuitry 504, a data interface 506, functional components 508, a program memory 510, and a memory 512. The various components of the expansion card 202 as shown in FIG. 5 are illustrated for ease of explanation, and may be combined with one another or separated from one another to form one or more integrated circuits, chips, systems on a chip (SoCs), etc. The expansion card 202 may include additional, fewer, or alternate components than those shown in FIG. 5. As one scenario illustrating such differences, the memory 510 and/or memory 512 may be implemented as a non-volatile memory or a volatile memory.

The processing circuitry 502 may be implemented as any suitable number and/or type of processors such as one or more graphics processors, a central processing unit (CPU), support circuits, digital signal processors, controllers, integrated circuits, or any other types of devices suitable for running applications and for data processing and analysis. The processing circuitry 502 may collectively include any suitable number and/or type of processors that may implement the functionality of the various techniques as described in this Section with respect to the expansion card 202. The processing circuitry 502 may be identified with any suitable type of hardware components based upon the particular implementation of the expansion card 202.

The expansion card 202 may further include communication circuitry 504, which may be implemented as any suitable combination of hardware and/or software components to facilitate the expansion card 202 communicating with the electronic device 204 and/or other suitable electronic devices, components, etc. The communication circuitry 504 may include any suitable number and/or type of transmitters, receivers, transceivers, ports, drivers, buffers, etc., which enable the expansion card 202 to transmit and/or receive data from the electronic device 204 and/or other suitable electronic devices and/or components not shown in the Figures in accordance with any suitable number and/or type of communication protocols.

The expansion card 202 may further include a data interface 506, which may be implemented as any suitable combination of hardware and/or software components to facilitate the expansion card 202 communicating with the electronic device 204 and/or other suitable electronic devices, components, etc., in conjunction with the communication circuitry 504. The data interface 506 may be separate from and/or integrated as part of the communication circuitry 504. In any event, the data interface 506 may include any suitable number and/or type of wires, connectors, buses, ports, etc., in addition to or instead of the components described above with reference to the communication circuitry 504, which enable the expansion card 202 to transmit and/or receive data from the electronic device 204 and/or other suitable electronic devices and/or components not shown in the Figures in accordance with any suitable number and/or type of communication protocols. In one scenario, the communication circuitry 504 and data interface 506 may be identified with components of an M.2 connector and data interface such as a Peripheral Component Interconnect Express (PCI express) interface, which enables a communicative coupling with the electronic device 204, although the implementations described herein are not limited to this particular configuration, hardware, or protocols.

The expansion card 202 may also include one or more functional components 508, which may be implemented as any suitable number and/or type of hardware and/or software components to enable the expansion card 202 to perform specific functions. Thus, the specific implementation of the functional components 508 may differ depending upon the particular implementation of the expansion card 202. In various scenarios, the functional components 508 may be implemented as one or more transceivers, receivers, and/or transmitters to enable the expansion card 202 to perform wireless communications in accordance with any suitable number and/or type of communication protocols, such as the aforementioned WWAN communications. In other scenarios in which the expansion card 202 is implemented to perform non-communication based functions, the functional components 508 may be implemented as the hardware and/or software components to facilitate those functions, such as temperature monitoring components, memory controller components, USB drivers, etc. In any event, the functional components 508 include any suitable number and/or type of components that may perform respective operations for the expansion card 202 in accordance with respective parameter settings, which may be adjusted based upon the operating mode of the electronic device 204 as further discussed herein.

The expansion card 202 may also include any suitable type of memory 510, which stores data and/or instructions, such as instructions executable by the processing circuitry 502. The memory may be implemented as any well-known volatile and/or non-volatile memory, including read-only memory (ROM), random access memory (RAM), flash memory, a magnetic storage media, an optical disc, erasable programmable read only memory (EPROM), and programmable read only memory (PROM). The memory can be non-removable, removable, or a combination of both.

The memory 510 may store computer-readable instructions such as the parameter settings adjustment module 511. The processing circuitry 502 may thus execute these instructions to perform the various techniques as discussed herein, which may include receiving the operating mode identifier from the electronic device 204, identifying the appropriate parameter settings to apply, and causing the functional component 508, as well as any other suitable components identified with the expansion card 202, to utilize these parameter settings. Furthermore, the processing circuitry 502 may execute the instructions stored in the parameter settings adjustment module 511 or other suitable instructions to enable communications (i.e. transmission and reception of data) with the electronic device 204, as discussed herein.

The expansion card 202 may also include any suitable type of memory 512, which may store data identified with an operational mode table as further discussed below. The memory 512 may be implemented as any well-known volatile or non-volatile memory, including read-only memory (ROM), random access memory (RAM), flash memory, a magnetic storage media, an optical disc, erasable programmable read only memory (EPROM), and programmable read only memory (PROM). The memory can be non-removable, removable, or a combination of both.

The expansion card 202 is configured to receive the operating mode identifier from the electronic device 204 as noted above via the data interface 506. The operating mode identifier may include the aforementioned index value that is determined from the table 400 via the connectivity service block 308 as discussed above with respect to FIG. 3. Thus, the operating mode identifier functions to identify the current operating mode of the electronic device 204 as noted above. Again, because the electronic device 204 uses a software-driven approach to identify the operating mode identifier that is transmitted to the expansion card 202, the data interface 506 is configured to receive the operating mode identifier from the electronic device 204 without the use of dedicated hardware pins, i.e. by using data communications via the data interface 506 in accordance with any suitable communication protocol.

To determine how to translate the operating mode of the electronic device 204 into an adjustment to the parameter settings of the expansion card 202, the memory 512 is configured to store an operational mode table 513. The operational mode table 513 may include the same information as the table 400 as discussed herein with respect to FIG. 4, or a subset of the stored data. The operational mode table 513 may be written to the memory 512 at any suitable time, which may include at the time of manufacture of the expansion card 202. Alternatively, the operational mode table 513 may be written to the memory 513 by downloading the data from the electronic device 204 upon startup, upon detecting a connection to the electronic device 204, or required parameter updates based on finding optimized parameter settings thru additional testing, updated country regulatory requirements or wireless carrier specification changes, etc.

In any event, the operational mode table 513 may store a set of indices (table indices) that match those discussed above with reference to the table 400, with each one of the indices being correlated with one or more specific parameter settings. Each of the parameter settings may represent parameter settings used by the expansion card 202 (such as via the functional components 508) to operate in accordance with a predetermined expansion card function. This predetermined expansion card function may include any suitable function as discussed herein for which the expansion card 202 is configured to perform, such as WWAN communications in accordance with a WWAN communication protocol.

Thus, the processing circuitry 502 is configured to select (such as via execution of the instructions represented as the parameter settings adjustment module 511) one of the indices based upon the operating mode identifier. As shown in FIG. 5, this may include the selection of an index number '2' in this particular scenario, which matches the index number received from the electronic device 204 as part of (or which optionally may be the same as) the operating mode identifier. Once the index is selected, the processing circuitry 502 may then identify the corresponding parameter settings that correlate with that specific index number, and then cause the expansion card to operate in accordance with the predetermined card function using those parameter settings.

The parameter settings may represent any suitable aspect of operation of the expansion card 202 that is desired to be adjusted for different operational modes for the electronic device 204 as discussed herein. In a scenario in which the expansion card 202 is configured to perform communications in accordance with a wireless communication protocol such as WWAN, Wi-Fi, Bluetooth, etc., the parameter settings may represent transmission power settings, codebook value settings for the antennas implemented by the expansion card 202, antenna tuner values, pattern steering parameters, power amplifier gain settings, a reduction from a maximum transmission power value such as transmit power back offs, etc., each in accordance with the particular wireless technology that is implemented by the expansion card 202. The adjustment of the parameter settings with respect to a wireless transmission power output may be particularly useful to ensure an appropriate transmission power backoff for compliance in accordance with a specific absorption rate (SAR) for a particular wireless communication technology (such as WWAN).

Moreover, one or more of the indices from the operational mode table 513 may be correlated with any suitable number N of parameter settings, and each one of the parameter settings may represent one or more (such as a set of) parameter settings to be used for a different operational aspect of the expansion card 202. In other words, each parameter settings set may be used by the expansion card 202 to perform a different predetermined expansion card function. In an illustrative and non-limiting scenario, the parameter settings set 1 as shown in FIG. 5 may be identified with transmission power output values, whereas the parameter settings set 2 may be identified with thermal monitoring settings. In this way, the operational mode of the electronic device 204 may be used to adjust any suitable number and/or type of functions performed by the expansion card 202.

Again, and as noted above with respect to FIG. 3, the connectivity service block 308 may identify the regulatory mode information, which is passed on to the ACPI function driver block 306, which then "filters" the operational mode information accordingly to identify a matching table entry for that particular regulatory mode. However, the operational mode table 513 may store sets of indices for any suitable number of OEM devices, each of which may potentially operate in a specific region subjected to different regulatory modes as noted above. Thus, the expansion card 202 may determine the regulatory mode information and/or product information via communications with the electronic device 204, which may then be used to determine the appropriate index using the operating mode identifier.

In one scenario, the expansion card 202 may (such as via the processing circuitry 502 executing instructions stored in the parameter settings adjustment module 511) communicate with the electronic device 202 to receive a product identifier (such as a serial number) and/or BIOS identifier (such as a unique code, version, etc.), which may be read from any suitable location of memory identified with electronic device 204 or otherwise received from the electronic device 204. Additionally or alternatively, the processing circuitry 502 may use the product identifier and/or BIOS identifier information to verify compatibility between the operational modes used by the electronic device 204 in accordance with the table 400 and the indices locally stored in the operational mode table 513.

This may include the use of a predetermined naming convention or code, a range of serial numbers that are checked, etc. The BIOS and/or product identifier may be used by the expansion card 202 to identify the relevant portion of the operational mode table 513 (i.e. a range of addresses) that is to be referenced in accordance with the received operational mode information. This relevant portion of the operational mode table 513 may include indices correlated to specific parameter settings for the configuration of the expansion card 202, which correspond to the specific product ID and regulatory mode of the electronic device 204. In this way, the processing circuitry 502 selects the appropriate index value and matching parameter settings based upon the BIOS identifier, the product identifier, and/or the operating mode identifier.

As noted above, the expansion card 202 and the electronic device 204 may work in conjunction with one another to adjust the parameter settings of the expansion card 202 in response to various operational modes of the electronic device 204 without the use of dedicated hardware pins. However, the techniques described herein may still leverage the use of dedicated hardware pins when available. Moreover, the techniques described herein may be implemented to enhance and/or expand the use of dedicated hardware pins in some scenarios. In one scenario, the operating mode identifier transmitted by the electronic device 204 may additionally or alternatively identify a current hardware pin mapping to specific sensors or other suitable hardware components to measure any suitable operational mode information, as noted herein. Again, the hardware pin mapping and operational mode information may be identified via the sensor hub and/or embedded controller 302 and/or the PCH of the electronic device 204, as noted herein.

Thus, the electronic device 204 may act as an additional proxy for hardware pin management modes. To provide an illustrative scenario of such an implementation, the electronic device 204 may multiplex the use of one or more hardware pins such that one or more sensors or hardware components share one or more (or all) of the dedicated hardware pins. This multiplexing may be achieved via any suitable switching network or other suitable hardware. Then, the operational mode identifier (or other suitable data transmitted to the expansion card 202) may indicate the current mapping of dedicated hardware pins to respective sensors or other hardware components.

The operational mode table 513 may, in such scenarios, store sets of indices that additionally or alternatively correspond to parameter settings that identify such hardware pin mappings. Therefore, the expansion card 202 may additionally or alternatively use the dedicated hardware pins to monitor and/or receive data based upon the identified mapping of the hardware pins at any particular time using the operational mode identifier received from the electronic device 204. This functionality may be implemented via the PCH of the electronic device upon the detection of certain conditions or scenarios, such as when each of the dedicated hardware pins are presently connected to a respective sensor or other hardware component (i.e. all hardware pins are used). In such a scenario, the PCH may make this determination independently and/or receive an indication (i.e. transmitted data) from one or more other components (such as via the sensor hub and/or embedded controller 302). Such techniques advantageously enable the electronic device 204 to function as an expanded proxy to multiplex any additional pin mapping changes to enable certain features, even when the use of the dedicated hardware pins have been otherwise exhausted.

General Configuration of an Expansion Card

An expansion card is provided. With reference to FIGS. 2, 3, and 5, the expansion card is configured to interface with an electronic device, and includes a data interface configured to receive, from the electronic device, an operating mode identifier that is indicative of a current operating mode of the electronic device; a memory configured to store a set of indices, each one of the set of indices being correlated with parameter settings used by the expansion card to operate in accordance with a predetermined expansion card function; and processing circuitry configured to select one of the set of indices based upon the operating mode identifier, and to cause the expansion card to operate in accordance with the predetermined expansion card function using the parameter settings that are correlated with the selected one of the set of indices. The data interface is configured to receive the operating mode identifier from the electronic device without the use of dedicated hardware pins. In addition or in alternative to and in any combination with the optional features previously explained in this paragraph, the data interface is further configured to receive a basic input/output system (BIOS) identifier from the electronic device, and the processing circuitry is configured to select the one of the set of indices based upon the BIOS identifier and the operating mode identifier. In addition or in alternative to and in any combination with the optional features previously explained in this paragraph, the memory comprises a non-volatile memory. In addition or in alternative to and in any combination with the optional features previously explained in this paragraph, the predetermined expansion card function comprises performing communications in accordance with a wireless wide area network (WWAN) communication protocol, and the parameter settings comprise a WWAN transmission power setting. In addition or in alternative to and in any combination with the optional features previously explained in this paragraph, the WWAN transmission power setting comprises a reduction from a maximum WWAN transmission power in accordance with a specific absorption rate (SAR) backoff. In addition or in alternative to and in any combination with the optional features previously explained in this paragraph, the electronic device comprises a laptop including a keyboard and display, and the operating mode identifier that is indicative of the current operating mode of the electronic device is based upon an angle formed between the keyboard and the display. In addition or in alternative to and in any combination with the optional features previously explained in this paragraph, the operating mode identifier that is indicative of the current operating mode of the electronic device is based upon a manner in which a user is interacting with the electronic device. In addition or in alternative to and in any combination with the optional features previously explained in this paragraph, the operating mode identifier that is indicative of the current operating mode of the electronic device is based upon one of (i) a proximity of the user to the electronic device, and (ii) a location of the user's hands with respect to the electronic device. In addition or in alternative to and in any combination with the optional features previously explained in this paragraph, each one of the set of indices is correlated with a set of parameter settings, each respective parameter settings from among the set of parameter settings being used by the expansion card to perform each respective one of a set of predetermined expansion card functions.

General Configuration of a Computer-Readable Medium

A computer-readable medium is provided. With reference to FIG. 5, the computer-readable medium has instructions stored thereon that, when executed by a processor identified with an expansion card configured to interface with an electronic device, cause the expansion card to: receive, from the electronic device, an operating mode identifier that is indicative of a current operating mode of the electronic device; select one of a set of stored indices based upon the operating mode identifier, each one of the set of indices being correlated with parameter settings used by the expansion card to operate in accordance with a predetermined expansion card function; and cause the expansion card to operate in accordance with the predetermined expansion card function using the parameter settings that are correlated with the selected one of the set of indices. The operating mode identifier is received from the electronic device without the use of dedicated hardware pins. In addition or in alternative to and in any combination with the optional features previously explained in this paragraph, the computer-readable medium further includes instructions that that, when executed by the processor, cause the expansion card to: receive a basic input/output system (BIOS) identifier from the electronic device; and select the one of the set of indices based upon the BIOS identifier and the operating mode identifier. In addition or in alternative to and in any combination with the optional features previously explained in this paragraph, the indices are stored in a non-volatile memory. In addition or in alternative to and in any combination with the optional features previously explained in this paragraph, the predetermined expansion card function comprises performing communications in accordance with a wireless wide area network (WWAN) communication protocol, and wherein the parameter settings comprise a WWAN transmission power setting. In addition or in alternative to and in any combination with the optional features previously explained in this paragraph, the WWAN transmission power setting comprises a reduction from a maximum WWAN transmission power in accordance with a specific absorption rate (SAR) backoff. In addition or in alternative to and in any combination with the optional features previously explained in this paragraph, the electronic device comprises a laptop including a keyboard and display, and the operating mode identifier that is indicative of the current operating mode of the electronic device is based upon an angle formed between the keyboard and the display. In addition or in alternative to and in any combination with the optional features previously explained in this paragraph, the operating mode identifier that is indicative of the current operating mode of the electronic device is based upon a manner in which a user is interacting with the electronic device. In addition or in alternative to and in any combination with the optional features previously explained in this paragraph, the operating mode identifier that is indicative of the current operating mode of the electronic device is based upon one of (i) a proximity of the user to the electronic device, and (ii) a location of the user's hands with respect to the electronic device. In addition or in alternative to and in any combination with the optional features previously explained in this paragraph, each one of the set of indices is correlated with a set of parameter settings, and the computer-readable medium further includes instructions that that, when executed by the processor, cause the expansion card to select each respective parameter settings from among the set of parameter settings to perform each respective one of a set of predetermined expansion card functions.

Figure 6:
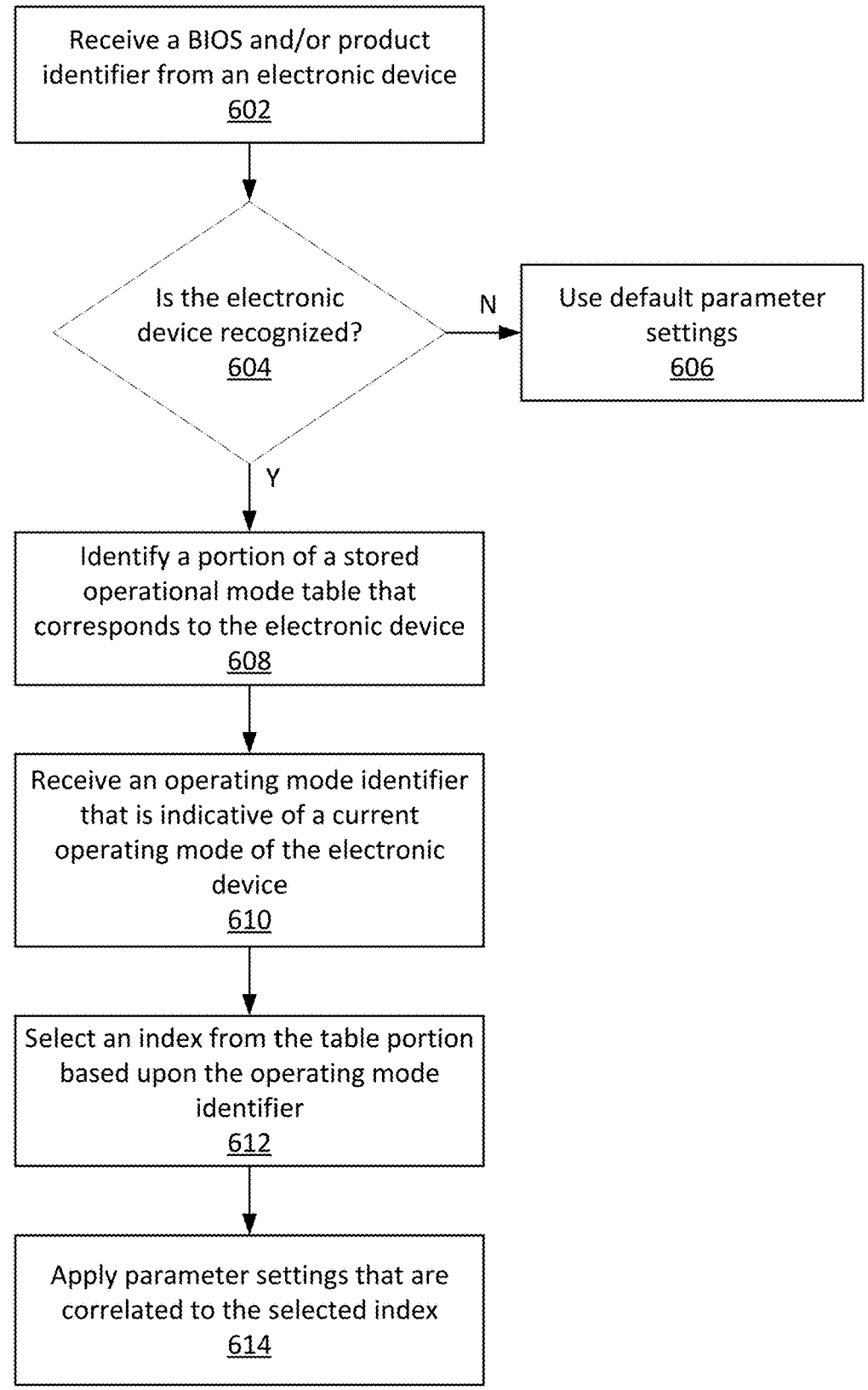
FIG. 6 illustrates a process flow, in accordance with the disclosure.

FIG. 6 illustrates a process flow, in accordance with the present disclosure. With reference to FIG. 6, the flow 600 may be a computer-implemented method executed by and/or otherwise associated with one or more processors (processing circuitry) and/or storage devices. These processors and/or storage devices may be associated with one or more computing components identified with an expansion card (such as the processing circuitry 502 of the expansion card 202 executing computer-readable instructions identified with the parameter settings adjustment module 511).

The one or more processors identified with one or more of the components as discussed herein may execute instructions stored on other computer-readable storage mediums not shown in the Figures (which may be locally-stored instructions and/or as part of the processing circuitries themselves). The flow 600 may include alternate or additional steps that are not shown in FIG. 6 for purposes of brevity, and may be performed in a different order than the steps shown in FIG. 6.

Flow 600 may begin when one or more processors receive (block 602) a BIOS and/or product identifier from an electronic device. The BIOS and/or product identifier may be received from the electronic device 204 as noted above.

Flow 600 may include one or more processors determining (block 604) whether the electronic device is recognized and/or compatible with the operational mode parameter setting adjustments as discussed herein. This determination may include, as noted above, the use of a predetermined naming convention or code, a range of serial numbers that are compared to known products, etc.

In the event that the product is not identified and/or the product is not compatible with the operational mode parameter setting adjustments as discussed herein, the process flow 600 includes the one or more processors using (block 606) default parameter settings. This may further include ignoring the receipt of operational mode identifiers as discussed herein.

When product is identified and/or the product is identified as being compatible with the operational mode parameter setting adjustments as discussed herein, the process flow 600 includes the one or more processors identifying (block 608) a portion of the stored operational mode table that corresponds to the electronic device. This may include, as noted above with reference to FIG. 5, the expansion card 202 identifying a range of addresses and/or a subset of the operational mode table 513 that corresponds to the regulatory mode and/or configuration for the electronic device 204.

The process flow 600 includes the one or more processors receiving (block 610) an operating mode identifier that is indicative of a current operating mode of an electronic device. This may include, as noted above with reference to FIG. 5, the expansion card 202 receiving an operating mode identifier that indicates a device mode and/or user interaction mode of the electronic device via the data interface 506.

The process flow 600 includes the one or more processors selecting (block 612) an index value from the table portion based upon the received (block 610) operating mode identifier. This may include, as noted above with reference to FIG. 5, the expansion card 202 selecting an index value that matches the index value received as part of the operating mode identifier from the electronic device 204.

The process flow 600 includes the one or more processors applying (block 614) parameter settings from the identified (block 608) operational mode table portion based upon the received (block 610) operating mode identifier. This may include, as noted above with reference to FIG. 5, the expansion card 202 operating in accordance with one or more predetermined card functions using the applied parameter settings.

EXAMPLES

The following examples pertain to various techniques of the present disclosure.

An example (e.g. example 1) relates to an expansion card configured to interface with an electronic device. The expansion card includes a data interface configured to receive, from the electronic device, an operating mode identifier that is indicative of a current operating mode of the electronic device; a memory configured to store a set of indices, each one of the set of indices being correlated with parameter settings used by the expansion card to operate in accordance with a predetermined expansion card function; and processing circuitry configured to select one of the set of indices based upon the operating mode identifier, and to cause the expansion card to operate in accordance with the predetermined expansion card function using the parameter settings that are correlated with the selected one of the set of indices.

Another example (e.g. example 2) relates to a previously-described example (e.g. example 1), wherein the data interface is configured to receive the operating mode identifier from the electronic device without the use of dedicated hardware pins.

Another example (e.g. example 3) relates to a previously-described example (e.g. one or more of examples 1-2), wherein the data interface is further configured to receive a basic input/output system (BIOS) identifier from the electronic device, and wherein the processing circuitry is configured to select the one of the set of indices based upon the BIOS identifier and the operating mode identifier.

Another example (e.g. example 4) relates to a previously-described example (e.g. one or more of examples 1-3), wherein the memory comprises a non-volatile memory.

Another example (e.g. example 5) relates to a previously-described example (e.g. one or more of examples 1-4), wherein the predetermined expansion card function comprises performing communications in accordance with a wireless wide area network (WWAN) communication protocol, and wherein the parameter settings comprise a WWAN transmission power setting.

Another example (e.g. example 6) relates to a previously-described example (e.g. one or more of examples 1-5), wherein the WWAN transmission power setting comprises a reduction from a maximum WWAN transmission power in accordance with a specific absorption rate (SAR) backoff.

Another example (e.g. example 7) relates to a previously-described example (e.g. one or more of examples 1-6), wherein the electronic device comprises a laptop including a keyboard and display, and wherein the operating mode identifier that is indicative of the current operating mode of the electronic device is based upon an angle formed between the keyboard and the display.

Another example (e.g. example 8) relates to a previously-described example (e.g. one or more of examples 1-7), wherein the operating mode identifier that is indicative of the current operating mode of the electronic device is based upon a manner in which a user is interacting with the electronic device.

Another example (e.g. example 9) relates to a previously-described example (e.g. one or more of examples 1-8), wherein the operating mode identifier that is indicative of the current operating mode of the electronic device is based upon one of (i) a proximity of the user to the electronic device, and (ii) a location of the user's hands with respect to the electronic device.

Another example (e.g. example 10) relates to a previously-described example (e.g. one or more of examples 1-9), wherein each one of the set of indices is correlated with a set of parameter settings, each respective parameter settings from among the set of parameter settings being used by the expansion card to perform each respective one of a set of predetermined expansion card functions.

An example (e.g. example 11) relates to a computer-readable medium having instructions stored thereon that, when executed by a processor identified with an expansion card configured to interface with an electronic device, cause the expansion card to: receive, from the electronic device, an operating mode identifier that is indicative of a current operating mode of the electronic device; select one of a set of stored indices based upon the operating mode identifier, each one of the set of indices being correlated with parameter settings used by the expansion card to operate in accordance with a predetermined expansion card function; and cause the expansion card to operate in accordance with the predetermined expansion card function using the parameter settings that are correlated with the selected one of the set of indices.

Another example (e.g. example 12) relates to a previously-described example (e.g. example 11), wherein the operating mode identifier is received from the electronic device without the use of dedicated hardware pins.

Another example (e.g. example 13) relates to a previously-described example (e.g. one or more of examples 11-12), further including instructions that that, when executed by the processor, cause the expansion card to: receive a basic input/output system (BIOS) identifier from the electronic device; and select the one of the set of indices based upon the BIOS identifier and the operating mode identifier.

Another example (e.g. example 14) relates to a previously-described example (e.g. one or more of examples 11-13), wherein the indices are stored in a non-volatile memory.

Another example (e.g. example 15) relates to a previously-described example (e.g. one or more of examples 11-14), wherein the predetermined expansion card function comprises performing communications in accordance with a wireless wide area network (WWAN) communication protocol, and wherein the parameter settings comprise a WWAN transmission power setting.

Another example (e.g. example 16) relates to a previously-described example (e.g. one or more of examples 11-15), wherein the WWAN transmission power setting comprises a reduction from a maximum WWAN transmission power in accordance with a specific absorption rate (SAR) backoff.

Another example (e.g. example 17) relates to a previously-described example (e.g. one or more of examples 11-16), wherein the electronic device comprises a laptop including a keyboard and display, and wherein the operating mode identifier that is indicative of the current operating mode of the electronic device is based upon an angle formed between the keyboard and the display.

Another example (e.g. example 18) relates to a previously-described example (e.g. one or more of examples 11-17), wherein the operating mode identifier that is indicative of the current operating mode of the electronic device is based upon a manner in which a user is interacting with the electronic device.

Another example (e.g. example 19) relates to a previously-described example (e.g. one or more of examples 11-18), wherein the operating mode identifier that is indicative of the current operating mode of the electronic device is based upon one of (i) a proximity of the user to the electronic device, and (ii) a location of the user's hands with respect to the electronic device.

Another example (e.g. example 20) relates to a previously-described example (e.g. one or more of examples 11-19), wherein each one of the set of indices is correlated with a set of parameter settings, and further including instructions that that, when executed by the processor, cause the expansion card to select each respective parameter settings from among the set of parameter settings to perform each respective one of a set of predetermined expansion card functions.

An example (e.g. example 21) relates to an expansion card configured to interface with an electronic device. The expansion card includes a data interface means for receiving, from the electronic device, an operating mode identifier that is indicative of a current operating mode of the electronic device; a storage means for storing a set of indices, each one of the set of indices being correlated with parameter settings used by the expansion card to operate in accordance with a predetermined expansion card function; and processing means for selecting one of the set of indices based upon the operating mode identifier, and causing the expansion card to operate in accordance with the predetermined expansion card function using the parameter settings that are correlated with the selected one of the set of indices.

Another example (e.g. example 22) relates to a previously-described example (e.g. example 21), wherein the data interface means receives the operating mode identifier from the electronic device without the use of dedicated hardware pins.

Another example (e.g. example 23) relates to a previously-described example (e.g. one or more of examples 21-22), wherein the data interface means receives a basic input/output system (BIOS) identifier from the electronic device, and wherein the processing means selects the one of the set of indices based upon the BIOS identifier and the operating mode identifier.

Another example (e.g. example 24) relates to a previously-described example (e.g. one or more of examples 21-23), wherein the storage means comprises a non-volatile memory.

Another example (e.g. example 25) relates to a previously-described example (e.g. one or more of examples 21-24), wherein the predetermined expansion card function comprises performing communications in accordance with a wireless wide area network (WWAN) communication protocol, and wherein the parameter settings comprise a WWAN transmission power setting.

Another example (e.g. example 26) relates to a previously-described example (e.g. one or more of examples 21-25), wherein the WWAN transmission power setting comprises a reduction from a maximum WWAN transmission power in accordance with a specific absorption rate (SAR) backoff.

Another example (e.g. example 27) relates to a previously-described example (e.g. one or more of examples 21-26), wherein the electronic device comprises a laptop including a keyboard and display, and wherein the operating mode identifier that is indicative of the current operating mode of the electronic device is based upon an angle formed between the keyboard and the display.

Another example (e.g. example 28) relates to a previously-described example (e.g. one or more of examples 21-27), wherein the operating mode identifier that is indicative of the current operating mode of the electronic device is based upon a manner in which a user is interacting with the electronic device.

Another example (e.g. example 29) relates to a previously-described example (e.g. one or more of examples 21-28), wherein the operating mode identifier that is indicative of the current operating mode of the electronic device is based upon one of (i) a proximity of the user to the electronic device, and (ii) a location of the user's hands with respect to the electronic device.

Another example (e.g. example 30) relates to a previously-described example (e.g. one or more of examples 21-29), wherein each one of the set of indices is correlated with a set of parameter settings, each respective parameter settings from among the set of parameter settings being used by the expansion card to perform each respective one of a set of predetermined expansion card functions.

An example (e.g. example 31) relates to a computer-readable medium having instructions stored thereon that, when executed by a processing means identified with an expansion card configured to interface with an electronic device, cause the expansion card to: receive, from the electronic device, an operating mode identifier that is indicative of a current operating mode of the electronic device; select one of a set of stored indices based upon the operating mode identifier, each one of the set of indices being correlated with parameter settings used by the expansion card to operate in accordance with a predetermined expansion card function; and cause the expansion card to operate in accordance with the predetermined expansion card function using the parameter settings that are correlated with the selected one of the set of indices.

Another example (e.g. example 32) relates to a previously-described example (e.g. example 31), wherein the operating mode identifier is received from the electronic device without the use of dedicated hardware pins.

Another example (e.g. example 33) relates to a previously-described example (e.g. one or more of examples 31-32), further including instructions that that, when executed by the processing means, cause the expansion card to: receive a basic input/output system (BIOS) identifier from the electronic device; and to select the one of the set of indices based upon the BIOS identifier and the operating mode identifier.

Another example (e.g. example 34) relates to a previously-described example (e.g. one or more of examples 31-33), wherein the indices are stored in a non-volatile memory.

Another example (e.g. example 35) relates to a previously-described example (e.g. one or more of examples 31-34), wherein the predetermined expansion card function comprises performing communications in accordance with a wireless wide area network (WWAN) communication protocol, and wherein the parameter settings comprise a WWAN transmission power setting.

Another example (e.g. example 36) relates to a previously-described example (e.g. one or more of examples 31-35), wherein the WWAN transmission power setting comprises a reduction from a maximum WWAN transmission power in accordance with a specific absorption rate (SAR) backoff.

Another example (e.g. example 37) relates to a previously-described example (e.g. one or more of examples 31-36), wherein the electronic device comprises a laptop including a keyboard and display, and wherein the operating mode identifier that is indicative of the current operating mode of the electronic device is based upon an angle formed between the keyboard and the display.

Another example (e.g. example 38) relates to a previously-described example (e.g. one or more of examples 31-37), wherein the operating mode identifier that is indicative of the current operating mode of the electronic device is based upon a manner in which a user is interacting with the electronic device.

Another example (e.g. example 39) relates to a previously-described example (e.g. one or more of examples 31-38), wherein the operating mode identifier that is indicative of the current operating mode of the electronic device is based upon one of (i) a proximity of the user to the electronic device, and (ii) a location of the user's hands with respect to the electronic device.

Another example (e.g. example 40) relates to a previously-described example (e.g. one or more of examples 31-39), wherein each one of the set of indices is correlated with a set of parameter settings, and further including instructions that that, when executed by the processing means, cause the expansion card to select each respective parameter settings from among the set of parameter settings to perform each respective one of a set of predetermined expansion card functions.

An apparatus as shown and described.

A method as shown and described.

CONCLUSION

The disclosure described herein references mmWave bands of operation and/or technologies, which may be particularly well served by the functionality provided by the disclosure based upon the additional complexity required for controlling antenna operations. However, the techniques described herein may be implemented in accordance with any suitable frequency band or frequency bands of operation, and are not limited to the mmWave frequency bands.

As referenced herein, the term "mmWave frequency," or "mmWave bands," which the techniques described herein may implement as part of their operation, may include in various scenarios frequencies and frequency bands above 20 GHz, 24 GHz, 28 GHz, etc., up to an upper frequency. In some scenarios, mmWave frequency bands may include frequencies ranging from 20 GHz to 300 GHz, from 24 GHz to 300 GHz, etc. This may include the various bands known to be associated with or otherwise referred to as mm-Wave frequency bands such as 24 GHz, 28 GHz, 37 GHz, 39 GHz, 40 GHz, 47 GHz, 60 GHz, etc.

The aforementioned description will so fully reveal the general nature of the implementation of the disclosure that others can, by applying knowledge within the skill of the art, readily modify and/or adapt for various applications such specific implementations without undue experimentation and without departing from the general concept of the present disclosure. Therefore, such adaptations and modifications are intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Each implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

The exemplary implementations described herein are provided for illustrative purposes, and are not limiting. Other implementations are possible, and modifications may be made to the exemplary implementations. Therefore, the specification is not meant to limit the disclosure. Rather, the scope of the disclosure is defined only in accordance with the following claims and their equivalents.

Throughout the drawings, it should be noted that like reference numbers are used to depict the same or similar elements, features, and structures, unless otherwise noted.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. The terms "group (of)", "set (of)", "collection (of)", "series (of)", "sequence (of)", "grouping (of)", etc., and the like in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The phrase "at least one of" with regard to a group of elements may be used herein to mean at least one element from the group consisting of the elements. The phrase "at least one of" with regard to a group of elements may be used herein to mean a selection of: one of the listed elements, a plurality of one of the listed elements, a plurality of individual listed elements, or a plurality of a multiple of individual listed elements.

What is claimed is:

1. An expansion card configured to interface with an electronic device, comprising:
   a data interface configured to receive, from the electronic device, an operating mode identifier that is indicative of a current operating mode of the electronic device;
   a memory configured to store a set of indices, each one of the set of indices being correlated with parameter settings used by the expansion card to operate in accordance with a predetermined expansion card function; and
   processing circuitry configured to select one of the set of indices based upon the operating mode identifier, and to cause the expansion card to operate in accordance with the predetermined expansion card function using the parameter settings that are correlated with the selected one of the set of indices,
   wherein the operating mode identifier that is indicative of the current operating mode of the electronic device is based upon a manner in which a user is interacting with the electronic device.

2. The expansion card of claim 1, wherein the data interface is configured to receive the operating mode identifier from the electronic device without the use of dedicated hardware pins.

3. The expansion card of claim 1, wherein the data interface is further configured to receive a basic input/output system (BIOS) identifier from the electronic device, and
   wherein the processing circuitry is configured to select the one of the set of indices based upon the BIOS identifier and the operating mode identifier.

4. The expansion card of claim 1, wherein the memory comprises a non- volatile memory.

5. The expansion card of claim 1, wherein the predetermined expansion card function comprises performing communications in accordance with a wireless wide area network (WWAN) communication protocol, and
   wherein the parameter settings comprise a WWAN transmission power setting.

6. The expansion card of claim 5, wherein the WWAN transmission power setting comprises a reduction from a maximum WWAN transmission power in accordance with a specific absorption rate (SAR) backoff.

7. The expansion card of claim 1, wherein the operating mode identifier that is indicative of the current operating mode of the electronic device is based upon one of (i) a proximity of the user to the electronic device, and (ii) a location of the user's hands with respect to the electronic device.

8. The expansion card of claim 1, wherein each one of the set of indices is correlated with a set of parameter settings, each one of the set of parameter settings being used by the expansion card to perform each respective one of a set of predetermined expansion card functions.

9. A computer-readable medium having instructions stored thereon that, when executed by a processor identified with an expansion card configured to interface with an electronic device, cause the expansion card to:
   receive, from the electronic device, an operating mode identifier that is indicative of a current operating mode of the electronic device;
   select one of a set of stored indices based upon the operating mode identifier, each one of the set of indices being correlated with parameter settings used by the expansion card to operate in accordance with a predetermined expansion card function; and
   cause the expansion card to operate in accordance with the predetermined expansion card function using the parameter settings that are correlated with the selected one of the set of indices,
   wherein the operating mode identifier that is indicative of the current operating mode of the electronic device is based upon a manner in which a user is interacting with the electronic device.

10. The computer-readable medium of claim 9, wherein the operating mode identifier is received from the electronic device without the use of dedicated hardware pins.

11. The computer-readable medium of claim 9, further including instructions that that, when executed by the processor, cause the expansion card to:

receive a basic input/output system (BIOS) identifier from the electronic device; and select the one of the set of indices based upon the BIOS identifier and the operating mode identifier.

12. The computer-readable medium of claim 9, wherein the indices are stored in a non-volatile memory.

13. The computer-readable medium of claim 9, wherein the predetermined expansion card function comprises performing communications in accordance with a wireless wide area network (WWAN) communication protocol, and wherein the parameter settings comprise a WWAN transmission power setting.

14. The computer-readable medium of claim 13, wherein the WWAN transmission power setting comprises a reduction from a maximum WWAN transmission power in accordance with a specific absorption rate (SAR) backoff.

15. The computer-readable medium of claim 9, wherein the operating mode identifier that is indicative of the current operating mode of the electronic device is based upon one of (i) a proximity of the user to the electronic device, and (ii) a location of the user's hands with respect to the electronic device.

16. The computer-readable medium of claim 9, wherein each one of the set of indices is correlated with a set of parameter settings, and further including instructions that that, when executed by the processor, cause the expansion card to select each one of the set of parameter settings to perform each respective one of a set of predetermined expansion card functions.

17. An expansion card configured to interface with an electronic device, comprising:

a data interface configured to receive, from the electronic device, an operating mode identifier that is indicative of a current operating mode of the electronic device;

a memory configured to store a set of indices, each one of the set of indices being correlated with parameter settings used by the expansion card to operate in accordance with a predetermined expansion card function; and processing circuitry configured to select one of the set of indices based upon the operating mode identifier, and to cause the expansion card to operate in accordance with the predetermined expansion card function using the parameter settings that are correlated with the selected one of the set of indices, wherein the electronic device comprises a laptop computer including a keyboard and a display, and wherein the operating mode identifier that is indicative of the current operating mode of the electronic device is based upon an angle formed between the keyboard and the display.

18. The expansion card of claim 17, wherein the data interface is configured to receive the operating mode identifier from the electronic device without the use of dedicated hardware pins.

19. A computer-readable medium having instructions stored thereon that, when executed by a processor identified with an expansion card configured to interface with an electronic device, cause the expansion card to:

receive, from the electronic device, an operating mode identifier that is indicative of a current operating mode of the electronic device;

select one of a set of stored indices based upon the operating mode identifier, each one of the set of indices being correlated with parameter settings used by the expansion card to operate in accordance with a predetermined expansion card function; and cause the expansion card to operate in accordance with the predetermined expansion card function using the parameter settings that are correlated with the selected one of the set of indices, wherein the electronic device comprises a laptop computer including a keyboard and a display, and wherein the operating mode identifier that is indicative of the current operating mode of the electronic device is based upon an angle formed between the keyboard and the display.

20. The computer-readable medium of claim 19, wherein the operating mode identifier is received from the electronic device without the use of dedicated hardware pins.

\* \* \* \* \*